United States Patent
Ishikawa et al.

(10) Patent No.: US 6,450,206 B2
(45) Date of Patent: Sep. 17, 2002

(54) BRAKE HOSE

(75) Inventors: Takashi Ishikawa; Hisashi Sato; Tomonori Saito; Yoji Kobayashi; Hideki Horikoshi; Tatsuya Kaito, all of Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/793,738

(22) Filed: Feb. 27, 2001

(30) Foreign Application Priority Data

Jul. 4, 2000 (JP) ........................................ 2000-206846

(51) Int. Cl.$^7$ ................................................. F16L 11/08
(52) U.S. Cl. ...................... 138/126; 138/124; 138/125; 138/137; 138/DIG. 1
(58) Field of Search ................................. 138/126, 124, 138/125, 137, DIG. 1; 525/437

(56) References Cited

U.S. PATENT DOCUMENTS 4,983,691 A * 1/1991 Hergenrother et al. ...... 525/437
4,988,777 A * 1/1991 Hergenrother et al. ...... 525/437
5,242,993 A * 9/1993 Hergenrother et al. ...... 525/437
5,445,191 A * 8/1995 Green et al. ................. 138/126
5,526,848 A * 6/1996 Terashima et al. .......... 138/125

FOREIGN PATENT DOCUMENTS

JP 144379 11/1993

* cited by examiner

Primary Examiner—Patrick Brinson
(74) Attorney, Agent, or Firm—Antonelli, Terry, Stout & Kraus, LLP

(57) ABSTRACT

The present invention provides a novel brake hose capable of sufficiently satisfying the fatigue resistance and the corrosion resistance, with the excellent expansion resistance. In a brake hose comprising a first reinforcing fiber layer (2), an intermediate rubber (3), a second reinforcing fiber layer (4), and an external layer rubber (5) provided successively on the outer circumference of an internal layer rubber (1) for filling a brake fluid, the first reinforcing fiber layer (2) is made of a polyethylene-2,6-naphthalate fiber. Accordingly, all of the fatigue resistance, the corrosion resistance and the expansion resistance can both be realized at a high level.

1 Claim, 1 Drawing Sheet

BRAKE HOSE

BACKGROUND OF THE INVENTION

1. Field of the Invention

The present invention relates to a brake hose constituting a part of a brake system for an automobile, or the like.

2. Description of the Related Art

Conventionally, a brake hose constituting a part of a brake system for a passenger car, a bus, a truck, a train, or the like has been used as a hydraulic transmission hose connecting a chassis and a wheel caliper as an important safety part related to braking of an automobile, or the like.

Since such a brake hose is, in general, exposed to a severe mechanical stress such as bending or rolling by a repeated steering wheel operation, swaying of a wheel, or the like, the excellent fatigue resistance is required. Furthermore, in order to ensure a sharp movement of the brake system, the excellent expansion resistance is also required.

As a conventional brake hose with these characteristics required, those with a multi-layer structure having a first reinforcing fiber layer, an intermediate rubber, a second reinforcing fiber layer, and an external layer rubber successively disposed on the outer circumference of a tube-like internal layer rubber directly in contact with a brake fluid have been used widely.

Here, as the first and second reinforcing fiber layers, those provided by weaving a reinforcing fiber material such as a polyvinyl alcohol fiber and a rayon fiber have been used commonly for ensuring the fatigue resistance and the expansion resistance required for a brake hose.

In contrast, as a rubber material constituting the internal layer rubber, the intermediate rubber, and the external layer rubber, in general, a natural rubber (NR), a chloroprene rubber (CR), a styrene butadiene rubber (SBR), an ethylene propylene diene rubber (EPDM), isobutylene rubber (IIR), or the like are used. These rubber materials are used according to the characteristics required for each part.

The polyvinyl alcohol fiber and the rayon fiber for providing the first and second reinforcing fiber layers have a problem in that they can easily be deteriorated by a certain kind of a brake fluid and they have a poor durability. Therefore, recently, as the reinforcing fiber material constituting the first and second reinforcing fiber layers, use of a polyethylene terephthalate fiber, which has the excellent corrosion resistance, is discussed.

However, although the polyethylene terephthalate fiber has the dramatically superior corrosion resistance compared with the polyvinyl alcohol fiber and the rayon fiber, since it has a small elastic modulus as a fiber, it is disadvantageous in terms of the expansion resistance (volume expansion amount), which is one of the important characteristics of a brake hose.

In the case the polyethylene terephthalate fiber is used in the first and second reinforcing fiber layers, although the corrosion resistance and the fatigue resistance can be improved dramatically compared with the conventional brake hoses, in contrast, since the volume expansion amount of the hose is made larger at the time of pressurizing, the braking response or the brake feeling becomes dull, and thus there is a risk of having the state of the "poor braking performance".

SUMMARY OF THE INVENTION

Accordingly, in order to solve the above-mentioned problems effectively, the present invention has been achieved, and an object thereof is to provide a novel brake hose capable of sufficiently satisfying the fatigue resistance and the corrosion resistance, with the excellent expansion resistance.

In order to solve the above-mentioned problems, a first invention is a brake hose comprising a reinforcing fiber layer made of a polyethylene-2,6-naphthalate fiber on the outer circumference of an internal layer rubber for filling a brake fluid as shown in a first aspect. A second invention is a brake hose comprising a reinforcing fiber layer on the outer circumference of an internal layer rubber for filling a brake fluid as well as an external layer rubber on the outer circumference of the reinforcing fiber layer, wherein the reinforcing fiber layer is made of a polyethylene-2,6-naphthalate fiber as shown in a second aspect.

Moreover, a third invention is a brake hose comprising a first reinforcing fiber layer, an intermediate rubber, a second reinforcing fiber layer, and an external layer rubber provided successively on the outer circumference of an internal layer rubber for filling a brake fluid, wherein the first reinforcing fiber layer is made of a polyethylene-2,6-naphthalate fiber as shown in a third aspect. A fourth invention is a brake hose comprising a first reinforcing fiber layer, an intermediate rubber, a second reinforcing fiber layer, and an external layer rubber provided successively on the outer circumference of an internal layer rubber for filling a brake fluid, wherein the first and second reinforcing fiber layers are made of a polyethylene-2,6-naphthalate fiber as shown in a fourth aspect.

Furthermore, a fifth invention is a brake hose comprising a first reinforcing fiber layer, an intermediate rubber, a second reinforcing fiber layer, and an external layer rubber provided successively on the outer circumference of an internal layer rubber for filling a brake fluid, wherein the first reinforcing fiber layer is made of a polyethylene-2,6-naphthalate fiber as well as the second reinforcing fiber layer is made of any one selected from the group consisting of a polyethylene terephthalate fiber, a polyvinyl alcohol fiber, and a rayon fiber.

That is, in the present invention, a polyethylene-2,6-naphthatlate fiber is adopted instead of the conventionally used reinforcing fiber materials, such as a polyvinyl alcohol fiber, a rayon fiber, and a polyethylene terephthalate fiber as the innermost side fiber reinforcing layer to be provided on the outer circumference of the internal layer rubber for filling the brake fluid.

As later described, the polyethylene-2,6-naphthalate fiber can provide the excellent fatigue resistance as well as it does not have a disadvantage of deterioration with respect to a certain kind of a brake fluid found in the conventional polyvinyl alcohol fiber, rayon fiber, or the like, nor a disadvantage of a poor expansion resistance found in the polyethylene terephthatlate fiber, or the like as described later.

Therefore, by using the polyethylene-2,6-naphthalate fiber provided with these excellent characteristics as the reinforcing fiber material for a fiber reinforcing layer, the corrosion resistance and the expansion resistance can both be provided at a high level, which has been difficult for the conventional reinforcing fiber materials.

Specifically, since one having a 0.5 to 8.5% dry heat shrinkage at 150° C., a 6.5 g or more tensile strength per a unit denier, and a 5% or less elongation at 4.5 g per a unit denier load is used as the polyethylene-2,6-naphthalate fiber as shown in a sixth aspect, the above-mentioned effects can be achieved further certainly.

Furthermore, since the internal layer rubber, the intermediate rubber, and the external layer rubber are made of any rubber material selected from the group consisting of a natural rubber (NR), a chloroprene rubber (CR), a styrene butadiene rubber (SBR), an ethylene propylene diene rubber (EPDM), isobutylene rubber (IIR), and a chlorosulfonated polyethylene (CSM) as shown in a seventh aspect, a brake hose with a low expansion property and the excellent corrosion resistance and fatigue resistance can be obtained easily.

DESCRIPTION OF THE PREFERRED EMBODIMENT

Figure 1:
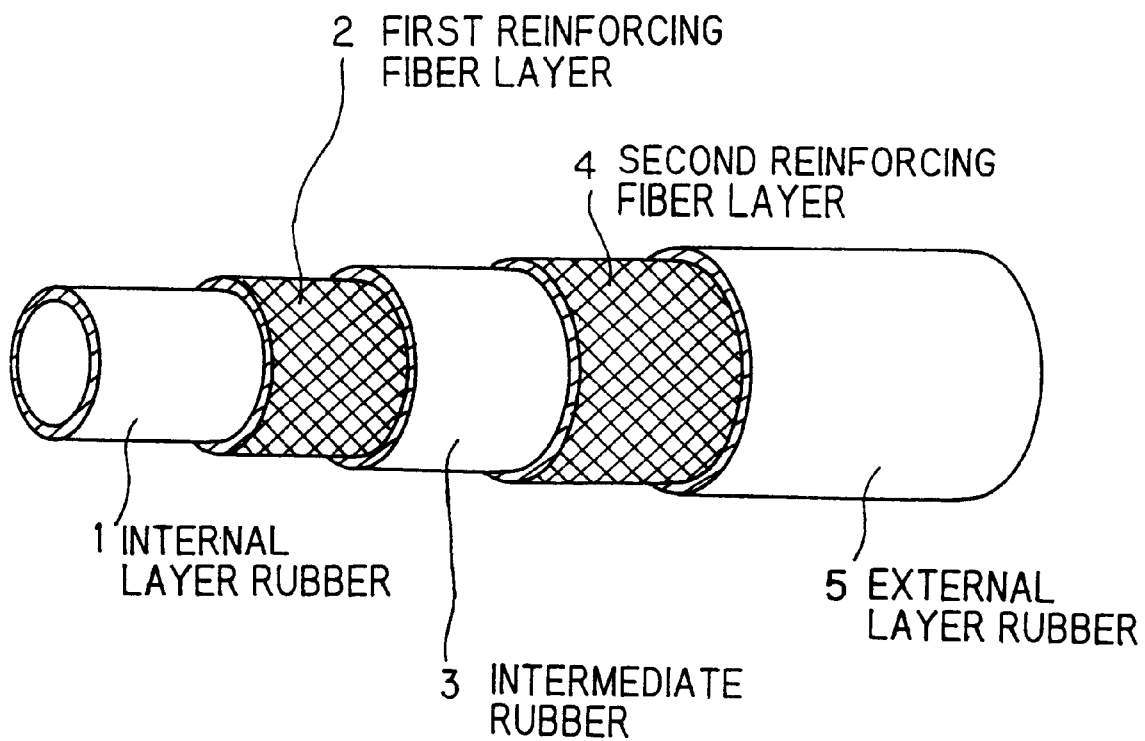
FIG. 1 is a perspective view showing an embodiment of a brake hose according to the present invention.

Hereinafter, a preferable embodiment of the present invention will be explained with reference to the drawing.

FIG. 1 shows an embodiment of a brake hose according to the present invention.

As shown in the figure, the brake hose comprises a multi-layer structure with a first reinforcing fiber layer 2 woven on the outer circumference of an internal layer rubber 1 having a tube-like shape for allowing direct passage of a brake fluid, a second reinforcing fiber layer 4 woven on the outer circumference of the first reinforcing fiber layer 2 via an intermediate rubber 3, and further an external layer rubber 5 on the outer circumference of the second reinforcing fiber layer 4 formed successively.

In the brake hose of the present invention, as the reinforcing fiber material constituting the first reinforcing fiber layer 2 and the second reinforcing fiber layer 4, a polyethylene-2,6-naphthalate fiber is used. Accordingly, the excellent fatigue resistance, corrosion resistance (brake fluid resistance), and expansion resistance can all be provided at a high level.

Since the polyethylene-2,6-naphthalate fiber has a naphthalene ring, its molecules are more rigid than those of the polyethylene terephthalate, and thus it has characteristics such as a high modulus and a low stretching property as a fiber. Moreover, it is also known that it has the excellent heat resistance for its small density difference between a crystal part and an amorphous part. Therefore, by using the polyethylene-2,6-naphthalate fiber having these characteristics as the reinforcing fiber material constituting the first reinforcing fiber layer 2 and the second reinforcing fiber layer 4, an expansion resistance and a corrosion resistance same as or higher than those of the conventional polyvinyl alcohol fiber, or the like can both be provided. Furthermore, since the polyethylene-2,6-naphthalate fiber does not have the risk of deterioration with respect to a certain kind of a brake fluid, or the like unlike the polyvinyl alcohol fiber, the excellent corrosion resistance same as or higher than that of the polyethylene terephthalate fiber, whose use is discussed, can be attained and besides, it has an expansion resistance dramatically superior to that of the polyethylene terephthalate fiber, the brake pressure can be transmitted instantaneously so that the response property at the time of braking and the brake feeling can be improved drastically.

Here, the fiber amount and the beating condition of the first and second reinforcing fiber layers 2, 4 are not particularly limited, but it is desirable to use one having a 0.5 to 8.5% dry heat shrinkage at 150° C., a 6.5 g or more tensile strength per a unit denier, and a 5% or less elongation at 4.5 g per a unit denier load as the polyethylene-2,6-naphthalate fiber. That is, this is because the volume expansion amount reducing effect is insufficient if the dry heat shrinkage at 150° C. is less than 0.5%, and in contrast, the operation property is drastically deteriorated, for example, the operation of pulling out a mandrel becomes difficult if it is more than 8.5%, and it is desirably 2 to 6%. Moreover, if the tensile strength per a unit denier is less than 6.5 g, a sufficient rupture strength cannot be obtained, and it is desirably 8.0 kg or more. Furthermore, if the elongation at 4.5 g per a unit denier load is more than 5%, the volume expansion amount reducing effect is insufficient, and it is desirably 3.5% or less.

Moreover, it is preferable to use conventionally used rubber materials as the rubber material constituting the internal layer rubber 1, the intermediate rubber 3, and the external layer rubber 5, such as a natural rubber (NR), a chloroprene rubber (CR), a styrene butadiene rubber (SBR), an ethylene propylene diene rubber (EPDM), isobutylene rubber (IIR), and a chlorosulfonated polyethylene (CSM) An optimum material is selected and used from these materials according to the characteristics required for each part.

In the case of using a plurality of the reinforcing fiber layers 2, 4, the above-mentioned polyethylene-2,6-naphthalate fiber needs to be used at least for the first reinforcing fiber layer 2 disposed at the innermost side. As to the reinforcing fiber layer 4 to be disposed at the outer side thereof, since the risk of deterioration by a brake fluid is smaller than the inner side reinforcing fiber layer 2, the inexpensive polyvinyl alcohol fiber or rayon fiber conventionally used can be adopted, or the polyethylene terephthalate fiber, or the like, whose use is discussed can also be adopted.

Although the case of a brake hose having a five-layer structure with a first reinforcing fiber layer 2, an intermediate rubber 3, a second reinforcing fiber layer 4, and an external layer rubber 5 provided successively on the outer circumference of an internal layer rubber 1 has been described in this embodiment, if the expansion resistance, the corrosion resistance, and the fatigue resistance can be performed sufficiently only with the first reinforcing fiber layer 2 according to the point of application, any or all of the intermediate rubber 3, the second reinforcing fiber layer 4, and the external layer rubber 5 to be formed thereon can be eliminated so as to provide a simpler structure.

EXAMPLES

Example 1

As the first reinforcing fiber layer 2 shown in FIG. 1, a 1,500 denier polyethylene-2,6-naphthalate fiber (the dry heat shrinkage at 150° C.: 1.2%, the tensile strength per a unit denier: 8.0 g, and the elongation at 4.5 g per a unit denier load: 4.0%) woven in a two fiber doubling by 24 beating condition was used. As the second reinforcing fiber layer 4, the same 1,500 denier polyethylene-2,6-naphthalate fiber woven in a three fiber doubling by 24 beading condition was used. Furthermore, the internal layer rubber 1 and the external layer rubber 5 were made from an ethylene propylene diene rubber (EPDM), and the internal rubber 3 was made from an isobutylene rubber (IIR) so as to produce a brake hose. Thereafter, the fatigue resistance, the volume expansion amount, the burst strength, the mandrel pulling out property, and the deterioration by a brake fluid thereof were measured. Results are shown in the table 1.

As the method for measuring the fatigue resistance, a repeated bending test was executed while applying a 0 to 100 kgf/cm² impulse pressure to the brake hose, and the number of bending when the brake hose was ruptured was counted. Moreover, as the method for evaluating the volume expansion amount, the content volume change amount of the brake hose with a 305 mm free length at the time of applying a 105 kgf/cm² pressure was measured based on the JIS-D2061 as well as the burst strength was measured also based on the JIS-D2061.

Example 2

A brake hose with the same configuration as that of the example 1 was produced except that a polyethylene-2,6-naphthalate fiber with a 3.2% dry heat shrinkage at 150° C., a 8.7 g tensile strength per a unit denier, and a 3.3% elongation at 4.5 g per a unit denier load was used as the first reinforcing fiber layer 2 shown in FIG. 1, and the characteristics thereof were evaluated by the same method as in the example 1.

Example 3

A brake hose with the same configuration as that of the example 1 was produced except that a polyethylene terephthalate fiber was used as the second reinforcing fiber layer 4 shown in FIG. 1, and the characteristics thereof were evaluated by the same method as in the example 1.

Example 4

A brake hose with the same configuration as that of the example 1 was produced except that a polyvinyl alcohol fiber was used as the second reinforcing fiber layer 4 shown in FIG. 1, and the characteristics thereof were evaluated by the same method as in the example 1.

Comparative Example 1

A brake hose with the same configuration as that of the example 1 was produced except that a polyethylene-2,6-naphthalate fiber with a 0.3% dry heat shrinkage at 150° C., a 8.5 g tensile strength per a unit denier, and a 4.3% elongation at 4.5 g per a unit denier load was used as the first reinforcing fiber layer 2 shown in FIG. 1, and the characteristics thereof were evaluated by the same method as in the example 1.

Comparative Example 2

A brake hose with the same configuration as that of the example 1 was produced except that a polyethylene-2,6-naphthalate fiber with a 9.1% dry heat shrinkage at 150° C., a 8.8 g tensile strength per a unit denier, and a 2.5% elongation at 4.5 g per a unit denier load was used as the first reinforcing fiber layer 2 shown in FIG. 1, and the characteristics thereof were evaluated by the same method as in the example 1.

Comparative Example 3

A brake hose with the same configuration as that of the example 1 was produced except that a polyethylene-2,6-naphthalate fiber with a 3.1% dry heat shrinkage at 150° C., a 6.2 g tensile strength per a unit denier, and a 3.4% elongation at 4.5 g per a unit denier load was used as the first reinforcing fiber layer 2 shown in FIG. 1, and the characteristics thereof were evaluated by the same method as in the example 1.

Comparative Example 4

A brake hose with the same configuration as that of the example 1 was produced except that a polyethylene-2,6-naphthalate fiber with a 0.7% dry heat shrinkage at 150° C., a 8.5 g tensile strength per a unit denier, and a 5.4% elongation at 4.5 g per a unit denier load was used as the first reinforcing fiber layer 2 shown in FIG. 1, and the characteristics thereof were evaluated by the same method as in the example 1.

Comparative Example 5

A brake hose with the same configuration as that of the example 1 was produced except that a polyethylene terephthatlate fiber with a 1.1% dry heat shrinkage at 150° C., a 8.6 g tensile strength per a unit denier, and a 8.6% elongation at 4.5 g per a unit denier load was used as the first reinforcing fiber layer 2 shown in FIG. 1, and the characteristics thereof were evaluated by the same method as in the example 1.

Comparative Example 6

A brake hose with the same configuration as that of the example 1 was produced except that a polyvinyl alcohol fiber with a 0.6% dry heat shrinkage at 150° C., a 9.5 g tensile strength per a unit denier, and a 3.3% elongation at 4.5 g per a unit denier load was used as the first reinforcing fiber layer 2 shown in FIG. 1, and the characteristics thereof were evaluated by the same method as in the example 1.

TABLE 1

| | Reinforcing fiber material | | | | Characteristics | | | | |
|---|---|---|---|---|---|---|---|---|---|
| | first reinforcing fiber layer | | | | | | | | |
| | material | dry heat shrinkage (%) | Strength (g/de) | 4.5 g/denier load elongation (%) | second reinforcing fiber layer material | fatigue resistance (number of bending) | volume expansion (cc/ft) | rupture strength (kgf/cm²) | mandrel pulling out property | brake fluid resistance |
| Example 1 | polyethylene-2,6-naphthalate | 1.2 | 8.0 | 4.0 | polyethylene-2,6-naphthalate | 1,850,000 | 0.15 | 1080 | ○ | ○ |
| Example 2 | polyethylene-2,6-naphthalate | 3.2 | 8.7 | 3.3 | polyethylene-2,6-naphthalate | 2,050,000 | 0.13 | 1050 | ○ | ○ |
| Example 3 | polyethylene-2,6-naphthalate | 3.2 | 8.7 | 3.3 | polyethylene terephthalate | 1,750,000 | 0.15 | 1000 | ○ | ○ |

TABLE 1-continued

| | Reinforcing fiber material | | | | | Characteristics | | | | |
|---|---|---|---|---|---|---|---|---|---|---|
| | first reinforcing fiber layer | | | | | | | | | |
| | | dry heat shrinkage (%) | Strength (g/de) | 4.5 g/denier load elongation (%) | second reinforcing fiber layer material | fatigue resistance (number of bending) | volume expansion (cc/ft) | rupture strength (kgf/cm²) | mandrel pulling out property | brake fluid resistance |
| | material | | | | | | | | | |
| Example 4 | polyethylene-2,6-naphthalate | 3.2 | 8.7 | 3.3 | polyvinyl alcohol | 1,900,000 | 0.14 | 1050 | ○ | ○ |
| Comparative Example 1 | polyethylene-2,6-naphthalate | 0.3 | 8.5 | 4.3 | polyethylene-2,6-naphthalate | 1,800,000 | 0.18 | 1000 | ○ | ○ |
| Comparative Example 2 | polyethylene-2,6-naphthalate | 9.1 | 8.8 | 2.5 | polyethylene-2,6-naphthalate | 2,000,000 | 0.13 | 1020 | X | ○ |
| Comparative Example 3 | polyethylene-2,6-naphthalate | 3.1 | 8.2 | 3.4 | polyethylene-2,6-naphthalate | 1,800,000 | 0.14 | 870 | ○ | ○ |
| Comparative Example 4 | polyethylene-2,6-naphthalate | 0.7 | 8.5 | 5.4 | polyethylene-2,6-naphthalate | 1,900,000 | 0.18 | 1050 | ○ | ○ |
| Comparative Example 5 | polyethylene terephthalate | 1.1 | 8.6 | 8.6 | polyethylene-2,6-naphthalate | 2,000,000 | 0.21 | 1000 | ○ | ○ |
| Comparative Example 6 | polyvinyl alcohol | 0.6 | 9.5 | 3.3 | polyethylene-2,6-naphthalate | 550,000 | 0.16 | 1050 | ○ | Δ |

As a result, as is apparent from the table 1, according to the brake hosed of the examples 1 to 4 of the present invention, a sufficient performance can be achieved in all of the fatigue resistance, the volume expansion amount, and the burst strength. Moreover, the mandrel pulling out property is also good as well as deterioration by the brake fluid is not observed at all.

In contrast, in the case of the comparative example 1 with the polyethylene-2,6-naphathalate fiber used for the first reinforcing fiber layer 2 having a dry heat shrinkage lower than the value defined in the present invention, the volume expansion amount is as large as 0.18. On the other hand, in the case of the comparative example 2 with the polyethylene-2,6-naphathalate fiber having a dry heat shrinkage higher than the value defined in the present invention, although a sufficient characteristic is provided in all of the fatigue resistance, the volume expansion amount, and the burst strength, the mandrel pulling out property is drastically deteriorated, and thus it can hardly be adopted in terms of the mass productivity.

Next, in the case of comparative example 3 with the polyethylene-2,6-naphathalate fiber used for the first reinforcing fiber layer 2 having a strength lower than the value defined in the present invention, the burst strength is drastically deteriorated. Moreover, in the case of the comparative example 4 with the polyethylene-2,6-naphathalate fiber having a elongation at 4.5 g load higher than the value defined in the present invention, the volume expansion is insufficient.

Furthermore, in the case of the comparative example 5 with the polyethylene terephthalate fiber used for the first reinforcing fiber layer 2, the volume expansion is drastically deteriorated. Moreover, in the case of the comparative example 6 similarly with the polyvinyl alcohol fiber used, not only the fatigue resistance is drastically deteriorated but also the deterioration was generated by the brake fluid.

As heretofore explained, according to the present invention, since the excellent fatigue resistance can be performed with respect to a severe mechanical stress such as bending or rolling by a repeated steering wheel operation, swaying of a wheel, or the like, as well as the corrosion resistance with respect to the brake fluid can be improved, the risk of deterioration by the brake fluid can be eliminated, and thus the excellent reliability and a long life can be obtained. Moreover, since the volume expansion ratio at the time of pressurizing (braking) can be made smaller, the hydraulic pressure can be transmitted sharply, and thus the excellent effects such as improvement of the brake feeling, and capability of performing the excellent response property can be realized.

What is claimed is:

1. A brake hose comprising a reinforcing fiber layer made of a polyethylene-2, 6-naphthalate fiber on the outer circumference of an internal layer rubber of filling a brake fluid;

wherein the polyethylene-2, 6-naphthalate fiber has a 0.5 to 8.5% dry heat shrinkage at 150° C., a 6.5 g or more tensile strength per a unit denier, and a 5% or less elongation at 4.5 g per a unit denier load.

* * * * *